W. G. BLODGETT AND M. H. ROACH.
EXHIBITING DEVICE.
APPLICATION FILED MAR. 19, 1920.

1,393,743.   Patented Oct. 18, 1921.
2 SHEETS—SHEET 1.

INVENTORS
WILLIAM G. BLODGETT
MAHLON H. ROACH
BY
ATT'YS.

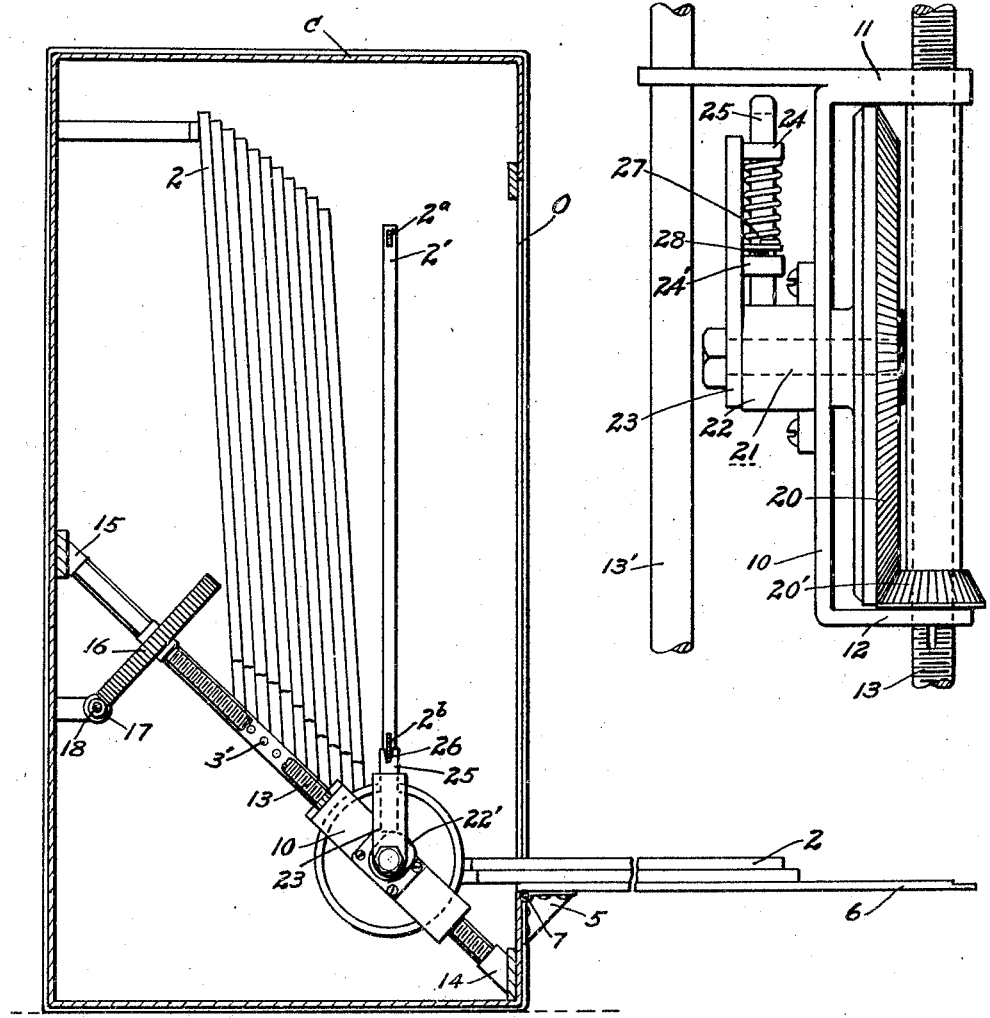
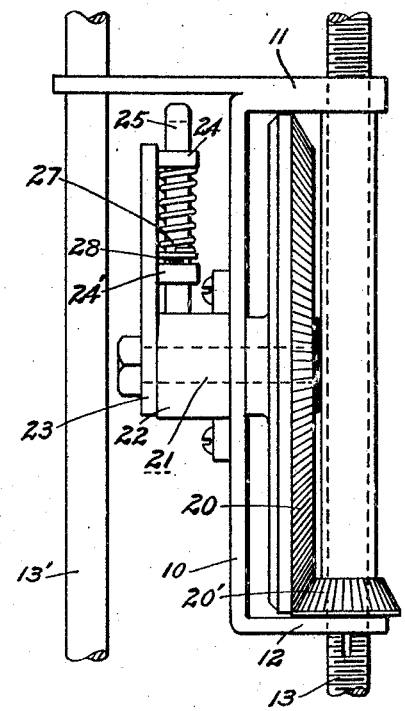
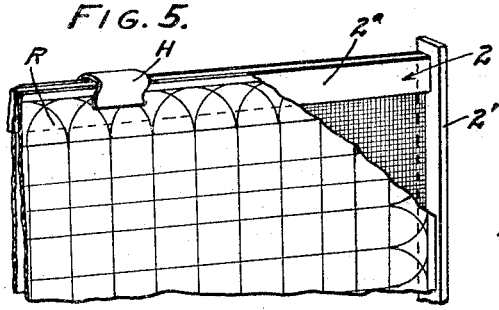

UNITED STATES PATENT OFFICE.

WILLIAM G. BLODGETT AND MAHLON H. ROACH, OF LOS ANGELES, CALIFORNIA.

EXHIBITING DEVICE.

1,393,743.    Specification of Letters Patent.    Patented Oct. 18, 1921.

Application filed March 19, 1920. Serial No. 367,141.

*To all whom it may concern:*

Be it known that we, WILLIAM G. BLODGETT and MAHLON H. ROACH, citizens of the United States, residing at Los Angeles, in the county of Los Angeles and State of California, have invented new and useful Improvements in Exhibiting Devices, of which the following is a specification.

This invention relates to exhibiting apparatus and has for its object to provide a simple, substantial, compact, but effective displaying device operative continuously with a minimum of power consumption and which has a large display capacity. The invention consists of the construction, the combination, and in details and arrangements of the parts, an embodiment of which invention is illustrated in the accompanying drawings and described and claimed hereinafter.

Fig. 3 is a vertical section showing some of the frames or swinging wings in the upright stacked relation and some in a lowered relation and one in the intermediate position.

Fig. 4 is an enlarged detail elevational view of the traveling carrier.

Fig. 5 is a perspective of a fragment of the upper portion of one of the exhibiting frames or wings to which is connected an object to be exhibited.

Figure 1:
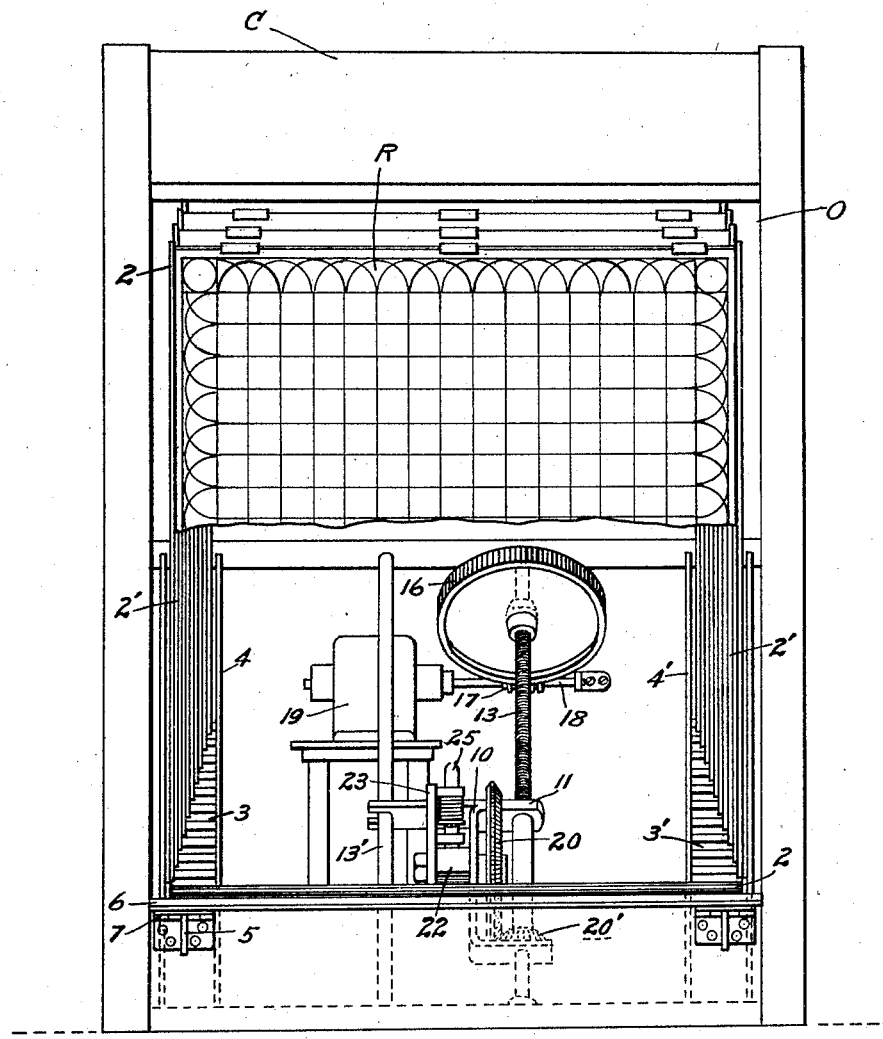
Figure 1 is a front elevation of an embodiment of the invention.
Figure 2:
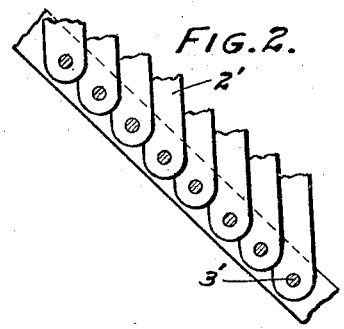
Fig. 2 is a sectional view of a portion of the rack on which the swinging frames are mounted.

The present invention is adapted to be used for an infinite variety of exhibition purposes and is especially effective for the display of large or small rugs or other objects most effectively shown when arranged in a flat position and in its illustrated form the invention comprises a series of wings or frames 2 of any suitable construction according to the purpose for which they are to be utilized. The frames are shown as substantially of rectangular form with parallel side members 2' and a transverse top member 2ª. As shown in Fig. 1 the frames are arranged with their lower ends pivoted on respective transverse pivots that are formed of sets of coaxial rungs 3—3' one set for the lower end of each frame. The sets of rungs are arranged in parallel relation to each other and supported in stringers 4—4' forming ladder like arrangements at the sides of the frames and these stringers of rungs are shown as arranged obliquely with respect to any suitable chamber in which it may be desired to display the objects secured to the frames 2.

The frames are each of progressively increasing width from the back of the stack shown in Fig. 3 down to the lower end of the stringers of the rungs so that the side elements 2' of one frame nest in close overlapping relation to the frames on each side thereof thus enabling a considerable number of display frames or wings to be arranged in compact relation on their respective rungs 3—3'; enabling these to be set as close together in parallel relation as practicable according to the size of the elements.

From this it will be seen that each frame can be successively turned about its pivots from one position to another, as for instance, from the upright position in Fig. 3 to a horizontal position, the frames stacking against each other in either of these positions.

While the device may be constructed and arranged to support the frames in a wholly exposed position, preferably the organization is incased in a room, closet, or box indicated at C having one side at opening O forming a window through which the upright frames can be viewed from one side and through which the frames can be turned or dropped forwardly into a substantially horizontal position thereby exposing the opposite or rear side of the frame.

The casing or chamber C is provided at the lower front portion of its window with a bracket or stop member 5 on which may rest a cover 6 hinged at 7 to be turned to the window in closing position when desired; and on which the frames will be supported as they are lowered.

A form of apparatus for successively lowering and returning the frames or wings from one position to another and then back is shown as comprising a carriage or traveler 10 having a frame-like portion with arms 11 and 12 which are perforated to receive a driving screw 13 one end of which is arranged in a step bearing 14 and the opposite end in a head bearing 15; these bearings being suitably mounted in the casing or chamber C. On the upper end of the screw 13 is secured a worm wheel 16 that is engaged by a worm 17 suitably driven and shown as provided on the shaft 18 of a reversible motor 19 to which current may be supplied for operating purposes. One or both of the arms 11—12 of the frame or traveler 10 may be threaded to interlock with the screw 13 so that when the latter is driven the traveler 10 will be shifted. A side rail 13' is arranged parallel to the screw 13 and is engaged by an extension of the arm 11 so as to firmly support and guide the traveler 10.

The screw 13 is shown as disposed between the strings of rungs and in the plane in which the strings of rungs lie so that the traveler 10 moves in this plane to and fro along the screw. Mounted on the traveler 10 is a gear wheel 20 having a shaft 21 passing through a hub or bearing 22 provided on the traveler 10 and on the end of this shaft there is secured a radial arm 23 having bearings 24 and 24' in which there is slidably mounted a dog 25 in the form of a pin with a transversely extending mouth 26 which will engage the adjacent transverse inner frame member 2$^b$ during the operation of the device. The dog 25 is normally retracted by a spring 27 engaging a supporting part as a pin 28 on the inner portion of the dog 25; the outer end of the spring 27 abutting against the bearing 24. The spring forces the inner end of the dog against the hub 22, which, as is shown in Fig. 3, has a cam or eccentric portion 22' so formed that when the gear 20 is rotated by the pinion 20' slidably keyed on the worm 13, the dog 25 will be projected as it swings around the cam 22' to engage a contiguous frame member 2$^b$. The engagement is maintained until the arm with the dog 25 brings the engaged frame to the desired position to release it which is done by the relief of the cam 22' permitting the dog 25 to be retracted from the frame and so that it can continue its rotary cycle with the gear 20 to pick up the next succeeding frame in its path.

Since the frames are pivoted on parallel axes along the stringers 4—4' it is necessary to progressively advance the traveler 10 so as to present the axis of the gear 20 and the radially disposed dog 25 in substantial alinement with the axes of said frames and which axes are formed by rungs 3—3'. This is done by the rotation of the shaft 13 which is provided with threads of such pitch that for each revolution of the gear 20 with its dog 25 the traveler 10 will have been advanced a distance equal to the distance between a pair of parallel frame pivots.

The screw shaft 13 is operated in one direction a suitable length of time to successively project dog 25 to engage the successive frames 2 when in one position and turn the same to another position and the direction of rotation of the shaft 13 is then reversed so that the turned wings or frames can be shifted back to the other position in succession.

Any suitable means may be utilized to secure the objects to be exhibited to the frames 2 and if it is desired to display objects such as rugs R Fig. 5, one rug may be secured on each side of a frame, and temporarily retained thereupon by simple clamps in the form of spring clips or holders H that can be passed over the edges of the rugs or other objects to frictionally hold the same upon the frame.

Various changes may be made without departing from the spirit of our invention as claimed.

What is claimed is:

1. An exhibiting device comprising a series of display frames each pivoted to swing on its own axis; the axes being equally spaced in parallel positions; the frames constructed and arranged to stack in different angular positions about their axes; and a traveling device movable in the plane of the axes and transversely thereto so as to successively pick up and swing each of the frames about its axis.

2. An exhibiting apparatus comprising a series of frames adapted to display objects thereon; a series of parallel pivots about which the frames swing each on its respective axis from one position to another; a traveler carrying a dog; means for swinging the dog about an axis of rotation; means for projecting the dog while it is swinging so as to engage successive frames; and means for shifting the traveler to bring the axis of rotation of the dog coincident with the axis of each frame.

3. In an exhibiting apparatus, a housing provided with an opening, a plurality of frames arranged in a substantially upright position within said housing to the rear of said opening and means for successively engaging the frames and swinging same forwardly through the opening in the housing and into a substantial horizontal plane in front of said housing, and which frame engaging and swinging means includes a support, a member arranged for rotation and adapted to travel lengthwise of said support, and a spring held frame engaging member carried by said rotatably mounted member.

4. In an exhibiting apparatus, the combination with a plurality of pivotally mounted frames, of means for successively engaging said frames and swinging the same upon their pivots, which means includes a rotatably mounted threaded shaft, a member mounted upon said shaft and adapted to move lengthwise thereof, a rotatably mounted member carried by the threaded shaft 13 supported member, and a frame engaging member carried by said rotatably mounted member.

5. In an exhibiting apparatus, the combination with a plurality of pivotally mounted frames, of means for successively engaging and swinging said frames upon their pivots, which frame engaging and swinging means comprises a threaded shaft that lies in the same plane with the axes of the frames, a runner mounted on said threaded shaft, a wheel supported by said runner and driven from the threaded shaft, a spring held frame engaging member, and an eccentric carried by said wheel and adapted to move said spring held member into engagement with a frame.

In testimony whereof we have signed our names to this specification.

WILLIAM G. BLODGETT.
MAHLON H. ROACH.